(12) United States Patent
Bach et al.

(10) Patent No.: US 6,421,927 B1
(45) Date of Patent: Jul. 23, 2002

(54) MEASURING TOOL

(76) Inventors: Michael L. Bach, 18385 Berthelot Rd., Ponchatoula, LA (US) 70454; James L. Slayton, 601 W. Union Rd., Carriere, MS (US) 39426

( * ) Notice: Subject to any disclaimer, the term of this patent is extended or adjusted under 35 U.S.C. 154(b) by 14 days.

(21) Appl. No.: 09/747,895

(22) Filed: Dec. 26, 2000

(51) Int. Cl.$^7$ .............................. G01B 3/38; B43L 7/14
(52) U.S. Cl. ............................ 33/427; 33/464; 33/810
(58) Field of Search ........................... 33/381, 427, 451, 33/452, 464, 474, 476, 478, 480, 783, 806, 810; 403/331; 248/229.1, 231.71

(56) References Cited

U.S. PATENT DOCUMENTS

| | | | | |
|---|---|---|---|---|
| 383,375 A | * | 5/1888 | Short ........................... | 33/340 |
| 1,220,664 A | * | 3/1917 | Maxwell ...................... | 33/340 |
| 1,379,253 A | * | 5/1921 | Dorney ........................ | 33/427 |
| 1,605,701 A | | 11/1926 | Brandt | |
| 1,863,236 A | * | 6/1932 | Brienza ........................ | 33/427 |
| 2,246,066 A | * | 6/1941 | Rothe ........................... | 33/427 |
| 2,720,705 A | | 10/1955 | Vincent | |
| 3,752,566 A | * | 8/1973 | Mathews ...................... | 33/200 |
| 4,035,923 A | | 7/1977 | Florczak | |
| 4,380,872 A | * | 4/1983 | Moran ........................... | 33/427 |
| 4,544,300 A | * | 10/1985 | Lew et al. ................... | 403/170 |
| 5,442,864 A | | 8/1995 | Erman | |
| 5,446,969 A | * | 9/1995 | Terenzoni ..................... | 33/419 |
| 5,519,942 A | | 5/1996 | Webb | |
| 5,722,179 A | | 3/1998 | Zanier | |
| D395,013 S | | 6/1998 | Webb | |
| 5,924,663 A | * | 7/1999 | Gatto ..................... | 248/231.71 |
| 6,203,878 B1 | * | 3/2001 | Davis et al. ................. | 224/270 |
| 6,234,707 B1 | * | 5/2001 | Maier-Hunke .............. | 403/331 |

* cited by examiner

Primary Examiner—Diego Gutierrez
Assistant Examiner—Ryan T. Hayleck

(57) ABSTRACT

A measuring tool for measuring in two directions orientated perpendicular to each other such that obstructions may be accurately measured. The measuring tool includes an elongated member having a first end, a second end, a top side, a bottom side, a front side, and a back side. The front side has an elongated slot therein. The slot extends between the first and second ends. The bottom side has a channel therein extending between the first and second ends. The front side has length measuring indicia thereon. The length measuring indicia extends between the first and second ends. Each of a pair of arms is movably positioned on the elongated member and each extends below the bottom side of the elongated member. Each of the arms are movably coupled to the slot and the channel. The arms each have measuring indicia thereon.

12 Claims, 3 Drawing Sheets

MEASURING TOOL

BACKGROUND OF THE INVENTION

1. Field of the Invention

The present invention relates to measuring tools and more particularly pertains to a new measuring tool for measuring in two directions orientated perpendicular to each other such that obstructions may be accurately measured.

2. Description of the Prior Art

The use of measuring tools is known in the prior art. More specifically, measuring tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,035,923; U.S. Pat. No. 5,519,942; U.S. Pat. Des. No. 395,013; U.S. Pat. No. 5,722,179; U.S. Pat. No. 1,605,701; U.S. Pat. No. 5,442,864; and U.S. Pat. No. 2,720,705

While these devices fulfill their respective, particular objectives and requirements, the aforementioned patents do not disclose a new measuring tool. The inventive device includes an elongated member having a first end, a second end, a top side, a bottom side, a front side, and a back side. The front side has an elongated slot therein. The slot extends between the first and second ends. The bottom side has a channel therein extending between the first and second ends. The front side has length measuring indicia thereon. The length measuring indicia extends between the first and second ends. Each of a pair of arms is movably positioned on the elongated member and each extends below the bottom side of the elongated member. Each of the arms are movably coupled to the slot and the channel. The arms each have measuring indicia thereon.

In these respects, the measuring tool according to the present invention substantially departs from the conventional concepts and designs of the prior art, and in so doing provides an apparatus primarily developed for the purpose of measuring in two directions orientated perpendicular to each other such that obstructions may be accurately measured.

SUMMARY OF THE INVENTION

In view of the foregoing disadvantages inherent in the known types of measuring tools now present in the prior art, the present invention provides a new measuring tool construction wherein the same can be utilized for measuring in two directions orientated perpendicular to each other such that obstructions may be accurately measured.

The general purpose of the present invention, which will be described subsequently in greater detail, is to provide a new measuring tool apparatus and method which has many of the advantages of the measuring tools mentioned heretofore and many novel features that result in a new measuring tool which is not anticipated, rendered obvious, suggested, or even implied by any of the prior art measuring tools, either alone or in any combination thereof.

To attain this, the present invention generally comprises an elongated member having a first end, a second end, a top side, a bottom side, a front side, and a back side. The front side has an elongated slot therein. The slot extends between the first and second ends. The bottom side has a channel therein extending between the first and second ends. The front side has length measuring indicia thereon. The length measuring indicia extends between the first and second ends. Each of a pair of arms is movably positioned on the elongated member and each extends below the bottom side of the elongated member. Each of the arms are movably coupled to the slot and the channel. The arms each have measuring indicia thereon.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new measuring tool apparatus and method which has many of the advantages of the measuring tools mentioned heretofore and many novel features that result in a new measuring tool which is not anticipated, rendered obvious, suggested, or even implied by any of the prior art measuring tools, either alone or in any combination thereof.

It is another object of the present invention to provide a new measuring tool which may be easily and efficiently manufactured and marketed.

It is a further object of the present invention to provide a new measuring tool which is of a durable and reliable construction.

An even further object of the present invention is to provide a new measuring tool which is susceptible of a low cost of manufacture with regard to both materials and labor, and which accordingly is then susceptible of low prices of sale to the consuming public, thereby making such measuring tool economically available to the buying public.

Still yet another object of the present invention is to provide a new measuring tool which provides in the apparatuses and methods of the prior art some of the advantages thereof, while simultaneously overcoming some of the disadvantages normally associated therewith.

Still another object of the present invention is to provide a new measuring tool for measuring in two directions orientated perpendicular to each other such that obstructions may be accurately measured.

Yet another object of the present invention is to provide a new measuring tool which includes an elongated member having a first end, a second end, a top side, a bottom side, a front side, and a back side. The front side has an elongated slot therein. The slot extends between the first and second ends. The bottom side has a channel therein extending between the first and second ends. The front side has length measuring indicia thereon. The length measuring indicia extends between the first and second ends. Each of a pair of arms is movably positioned on the elongated member and each extends below the bottom side of the elongated member. Each of the arms are movably coupled to the slot and the channel. The arms each have measuring indicia thereon.

Still yet another object of the present invention is to provide a new measuring tool that is also used for leveling.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
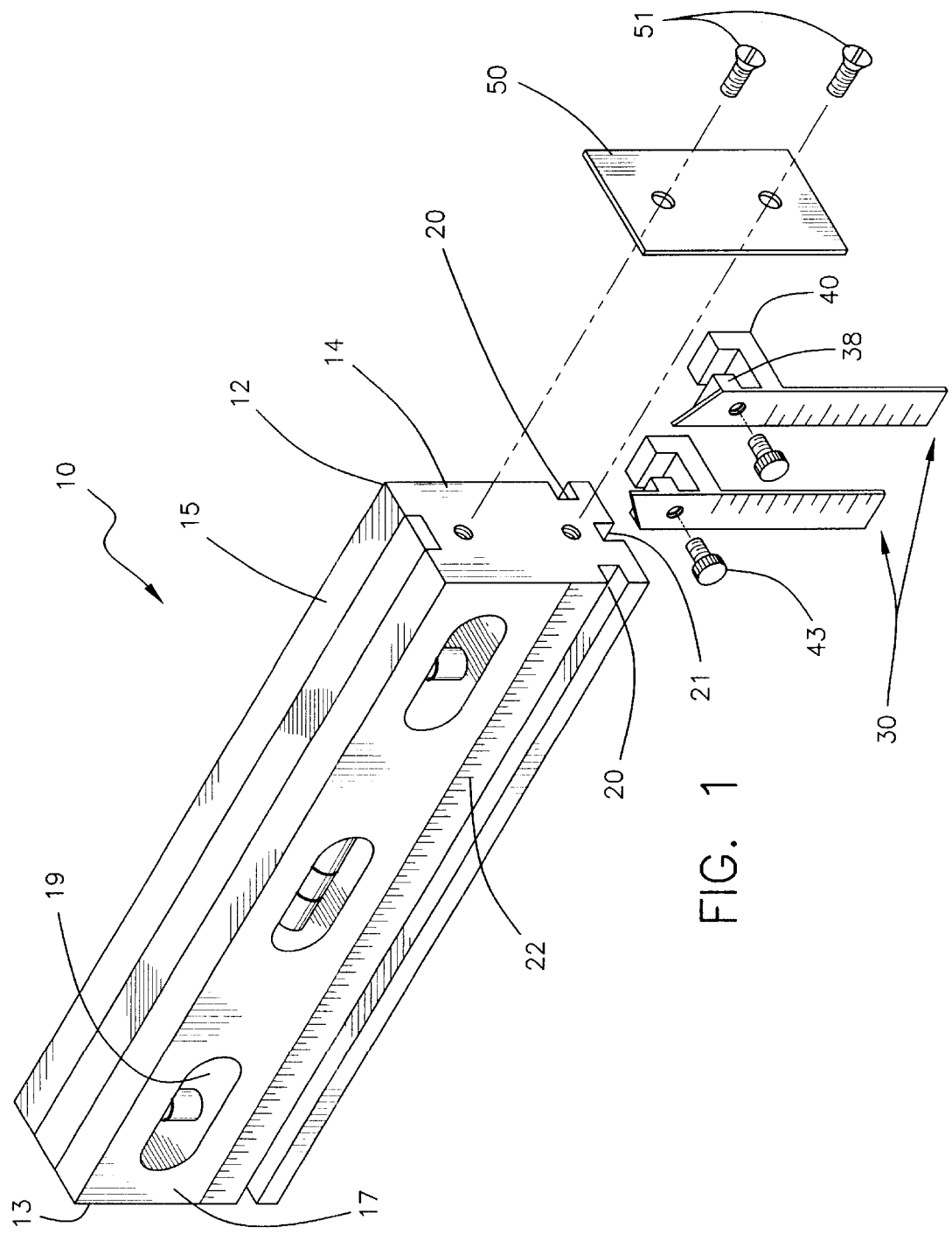
FIG. 1 is a schematic perspective view of a new measuring tool according to the present invention.
Figure 2:
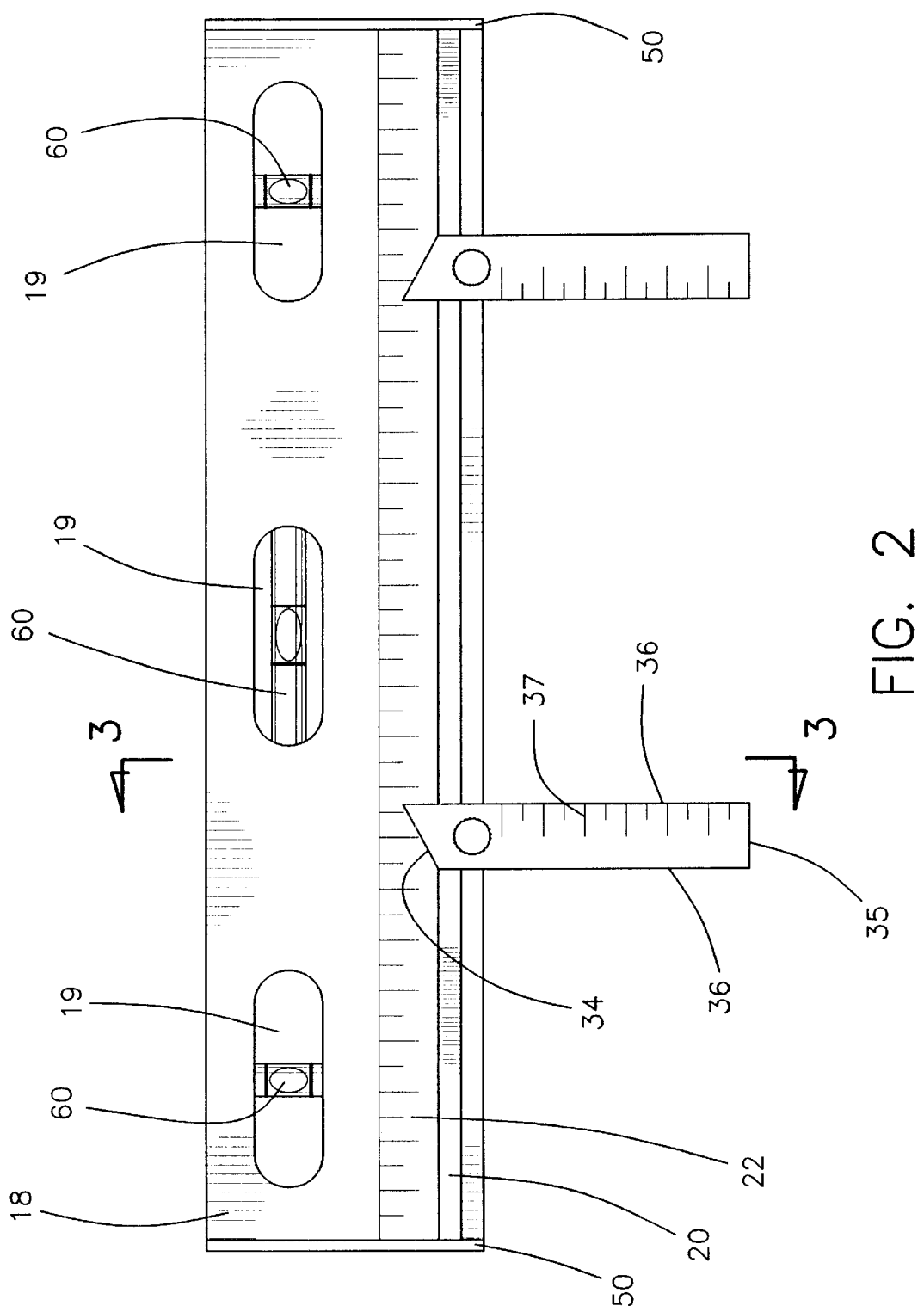
FIG. 2 is a schematic side view of the present invention.
Figure 3:
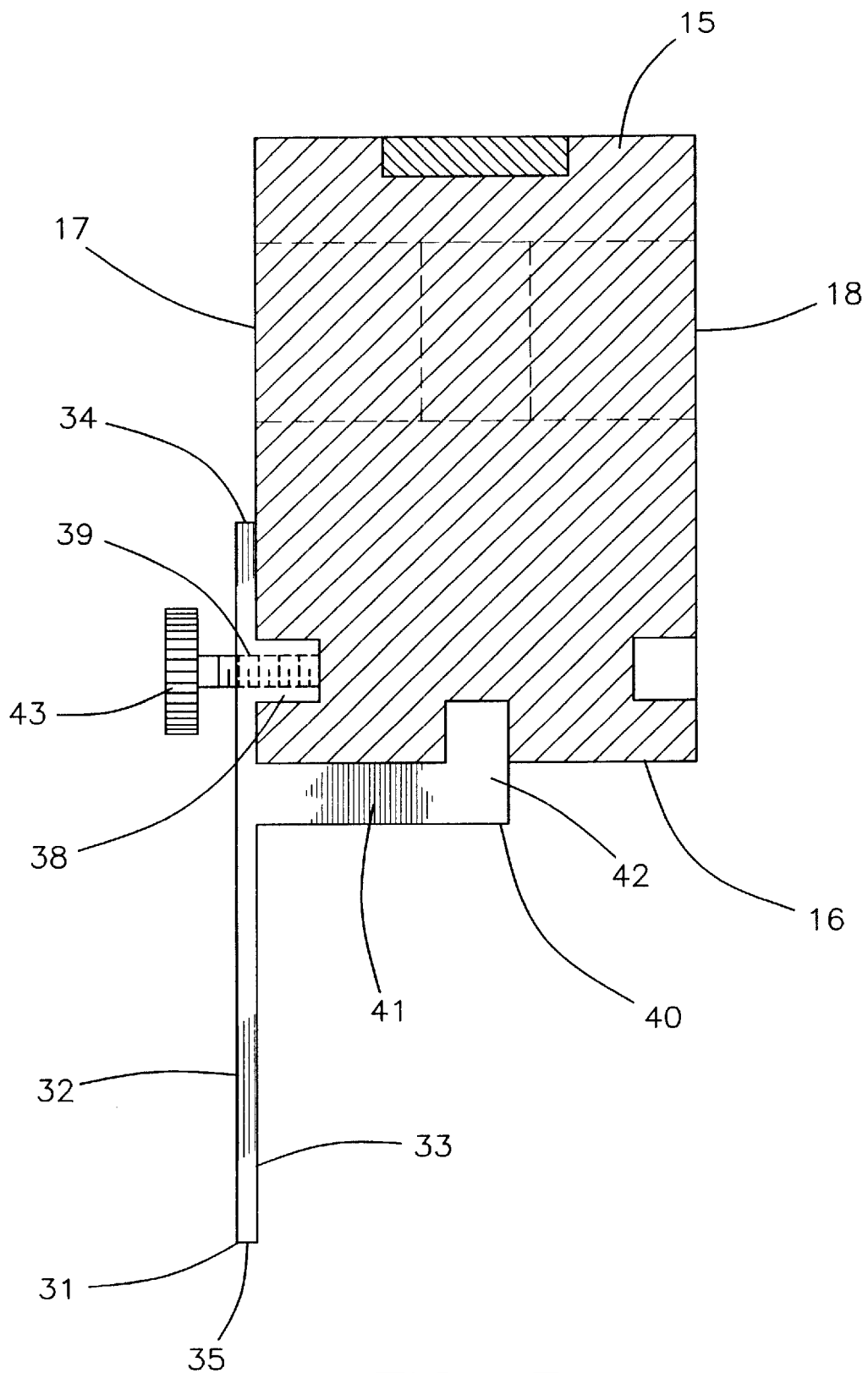
FIG. 3 is a schematic end view of the present invention.

With reference now to the drawings, and in particular to FIGS. 1 through 3 thereof, a new measuring tool embodying the principles and concepts of the present invention and generally designated by the reference numeral 10 will be described.

As best illustrated in FIGS. 1 through 3, the measuring tool generally comprises an elongated member 12 with a first end 13, a second end 14, a top side 15, a bottom side 16, a front side 17, and a back side 18. The elongated member 12 has a plurality of apertures 19 extending through the front 17 and back 18 sides. Each of the front 17 and back 18 sides has an elongated slot 20 therein. Each of the slots 20 extends between the first 13 and second 14 ends. The slots 20 are positioned generally adjacent to the bottom side 16. The bottom side 16 has a channel 21 therein extending between the first 13 and second 14 ends. The channel 21 is positioned between the front 17 and back 18 sides. Each of the front 17 and back 18 sides has length measuring indicia 22 thereon. The length measuring indicia 22 extends between the first 13 and second 14 ends and is positioned generally adjacent to a respective slot 20. The elongated member 12 has a length generally between 36 inches and 60 inches, and preferably a length equal to 48 inches. The elongated member ideally has a height equal to 4 inches and a width equal to 1¼ inches.

Each of a pair of arms 30 is movably positioned on the elongated member. Each of the arms 30 includes a plate 31 having a front surface 32, a back surface 33, a top edge 34, a bottom edge 35, and a pair of side edges 36. The top edge 34 is in an angular relationship with the side edges 36 such that the top edge 34 is relatively pointed. The plate 31 has a length between the top and bottom edges generally between 6 inches and 12 inches, and ideally equals 8½ inches. Length measuring indicia 37 is positioned on the front surface 32 of the plate 31. Both of the length measuring indicia 22, 37 may be in English or Metric units depending on the need.

A protruding member 38 is integrally coupled to and extends away from the back surface 33 of the plate 31. The protruding member 38 is generally adjacent to the top edge 34. The protruding member 38 is positionable in one of the slots 20. The plate 31 has an opening 39 extending through the front surface 32 and extending through the protruding member 38.

A bracket 40 for movably engaging the channel comprises a leg portion 41 and a foot portion 42. The leg portion 42 has a free end integrally coupled to the back surface 33 of the plate 31 such that the leg portion 41 extends away from the plate 31 and the foot portion 42 extends upwardly. The leg portion 41 is positioned between the protruding member 38 and the bottom edge 35 of the plate 31. The foot portion 42 may engage the channel 21 when the protruding member 38 is positioned in a slot 20.

A securing means 43 releasably secures the plate 31 to the elongated member 12. The securing means 43 is extendable through the opening 39 in the plate 31 and the protruding member 38. The securing means 43 preferably comprises a screw. The securing means 43 biases the bracket 40 against the channel 21 by pulling the protruding member 38 away from the slot 20.

Each of the arms 30 is positionable in one slot 20 such that each of the arms 30 may more in relation to each other. The top edges 34 are pointed in differing directions so that they may be angled toward each other when the brackets 40 engage the channel 21.

Each of a pair of panels 50 is positionable over one of the front 13 and back 14 ends of the elongated member 12. Each of the panels 50 covers open ends of the slots 20 and the channel 21 extending through the ends 13, 14 of the elongated member 12. Each of a pair of fastening means 51 extends through one of the panels 50 and into a respective end of the elongated member 12. Each of the fastening means 51 is preferably a screw.

Each of a plurality of levels 60 is positioned in one of the apertures 19 in the elongated member 12 and is securely coupled to the elongated member 12 such that each of the levels 60 is viewable through the apertures 19. A first of the levels is orientated horizontally, and a second of the levels is orientated vertically. Also envisioned is a level orientated at a 45 degree angle with respect to a longitudinal axis of the elongated member. The levels 60 are preferably conventional liquid levels.

In use, the elongated member 12 may be used as a conventional length-measuring tool. The device 10 may measure a first length along the elongated member 12 and a second length down the arms 30 using the measuring indicia on the plates 31. Additionally, the arms 30 may be moved to act as calipers for obtaining a width of an object protruding from a surface and may be secured in place using the securing means 43. This allows for simultaneously measuring the height and width of an obstruction and for accurately transferring the measurements for work such as in sheet metal work. The levels 60 are used as conventional levels.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A measuring tool for simultaneously measuring a first length in a first direction and a second length in a second direction, wherein the first direction is orientated generally perpendicular to the second direction, said tool comprising:

an elongated member having a first end, a second end, a top side, a bottom side, a front side, and a back side, said front side having an elongated slot therein, said slot extending between said first and second ends, said bottom side having a channel therein, said channel extending between said first and second ends, said front side having length measuring indicia thereon, said length measuring indicia extending between said first and second ends; and a pair of arms, each of said arms being movably positioned on said elongated member and extending below said bottom side of said elongated member, each of said arms being movably coupled to said slot and said channel, each of said arms having measuring indicia thereon.

2. The tool as in claim 1, further comprising:

said elongated member having a plurality of apertures extending therethrough; and a plurality of levels, each of said levels being positioned in one of said apertures in said elongated member and securely coupled to said elongated member such that each of said levels are viewable through said apertures.

3. The tool as in claim 2, wherein said elongated member has a length generally between 36 inches and 60 inches.

4. The tool as in claim 2, wherein each of the arms comprises:

a plate having a front surface, a back surface, a top edge, a bottom edge, and a pair of side edges;

length measuring indicia being positioned on said front surface of said plate;

a protruding member being integrally coupled to and extending away from said back surface of said plate, said protruding member being generally adjacent to said top edge, said protruding member being positionable in said slot; and a bracket for movably engaging said channel, said bracket comprising a leg portion and a foot portion, said leg portion having a free end integrally coupled to said back surface of said plate such that said leg portion extends away from said plate and said foot portion extends upwardly, said leg portion being positioned between said protruding member and said bottom edge of said plate, wherein said foot portion may engage said channel when said protruding member is positioned in said slot.

5. The tool as in claim 4, wherein said top edges of each of said plates being in an angular relationship with said side edges such that said top edges are relatively pointed.

6. The tool as in claim 5, further including:

said plate having an opening extending through said front surface and extending through said protruding member; and a securing means for releasably securing said plate to said elongated member, said securing means being extendable through said opening in said plate and said protruding member, said securing means comprising a screw.

7. The tool as in claim 2, further including:

a pair of panels, each of said panels being positionable over one of said front and back ends of said elongated member, each of said panels covering open ends of said slots and said channel extending through said ends of said elongated member, each of a pair of fastening means extending through one of said panels and into a respective end of said elongated member.

8. The tool as in claim 1, wherein each of the arms comprises:

a plate having a front surface, a back surface, a top edge, a bottom edge, and a pair of side edges;

length measuring indicia being positioned on said front surface of said plate;

a protruding member being integrally coupled to and extending away from said back surface of said plate, said protruding member being generally adjacent to said top edge, said protruding member being positionable in said slot; and a bracket for movably engaging said channel, said bracket comprising a leg portion and a foot portion, said leg portion having a free end integrally coupled to said back surface of said plate such that said leg portion extends away from said plate and said foot portion extends upwardly, said leg portion being positioned between said protruding member and said bottom edge of said plate, wherein said foot portion may engage said channel when said protruding member is positioned in said slot.

9. The tool as in claim 8, wherein said top edges of each of said plates being in an angular relationship with said side edges such that said top edges are relatively pointed.

10. The tool as in claim 9, further including:

said plate having an opening extending through said front surface and extending through said protruding member; and a securing means for releasably securing said plate to said elongated member, said securing means being extendable through said opening in said plate and said protruding member, said securing means comprising a screw.

11. The tool as in claim 1, further including:

a pair of panels, each of said panels being positionable over one of said front and back ends of said elongated member, each of said panels covering open ends of said slots and said channel extending through said ends of said elongated member, each of a pair of fastening means extending through one of said panels and into a respective end of said elongated member.

12. A measuring tool for simultaneously measuring a first length in a first direction and a second length in a second direction, wherein the first direction is orientated generally perpendicular to the second direction, said tool comprising:

an elongated member having a first end, a second end, a top side, a bottom side, a front side, and a back side, said elongated member having a plurality of apertures extending therethrough, each of said front and back sides having an elongated slot therein, each of said slots extending between said first and second ends, each of said slots being positioned generally adjacent to said bottom side, said bottom side having a channel therein, said channel extending between said first and second ends, said channel being positioned between said front and back sides, each of said front and back sides having length measuring indicia thereon, said length measuring indicia extending between said first and second ends and being positioned generally adjacent to a respective slot, said elongated member having a length generally between 36 inches and 60 inches;

a pair of arms, each of said arms being movably positioned on said elongated member, each of said arms comprising;

a plate having a front surface, a back surface, a top edge, a bottom edge, and a pair of side edges, said top edge being in an angular relationship with said side edges such that said top edge is relatively pointed, said plate having a length between said top and bottom edges generally between 6 inches and 12 inches;

length measuring indicia being positioned on said front surface of said plate;

a protruding member being integrally coupled to and extending away from said back surface of said plate, said protruding member being generally adjacent to said top edge, said protruding member being positionable in one of said slots, said plate having an opening extending through said front surface and extending through said protruding member;

a bracket for movably engaging said channel, said bracket comprising a leg portion and a foot portion, said leg portion having a free end integrally coupled to said back surface of said plate such that said leg portion extends away from said plate and said foot portion extends upwardly, said leg portion being positioned between said protruding member and said bottom edge of said plate, wherein said foot portion may engage said channel when said protruding member is positioned in said slot;

a securing means for releasably securing said plate to said elongated member, said securing means being extendable through said opening in said plate and said protruding member, said securing means comprising a screw;

wherein said securing means biases said bracket against said channel;

each of said arms being positionable in one slot such that each of said arms may more in relation to each other;

a pair of panels, each of said panels being positionable over one of said front and back ends of said elongated member, each of said panels covering open ends of said slots and said channel extending through said ends of said elongated member, each of a pair of fastening means extending through one of said panels and into a respective end of said elongated member; and a plurality of levels, each of said levels being positioned in one of said apertures in said elongated member and securely coupled to said elongated member such that each of said levels are viewable through said apertures, a first of said level being orientated horizontally, and a second of said levels being orientated vertically.

\* \* \* \* \*